Figure 1:
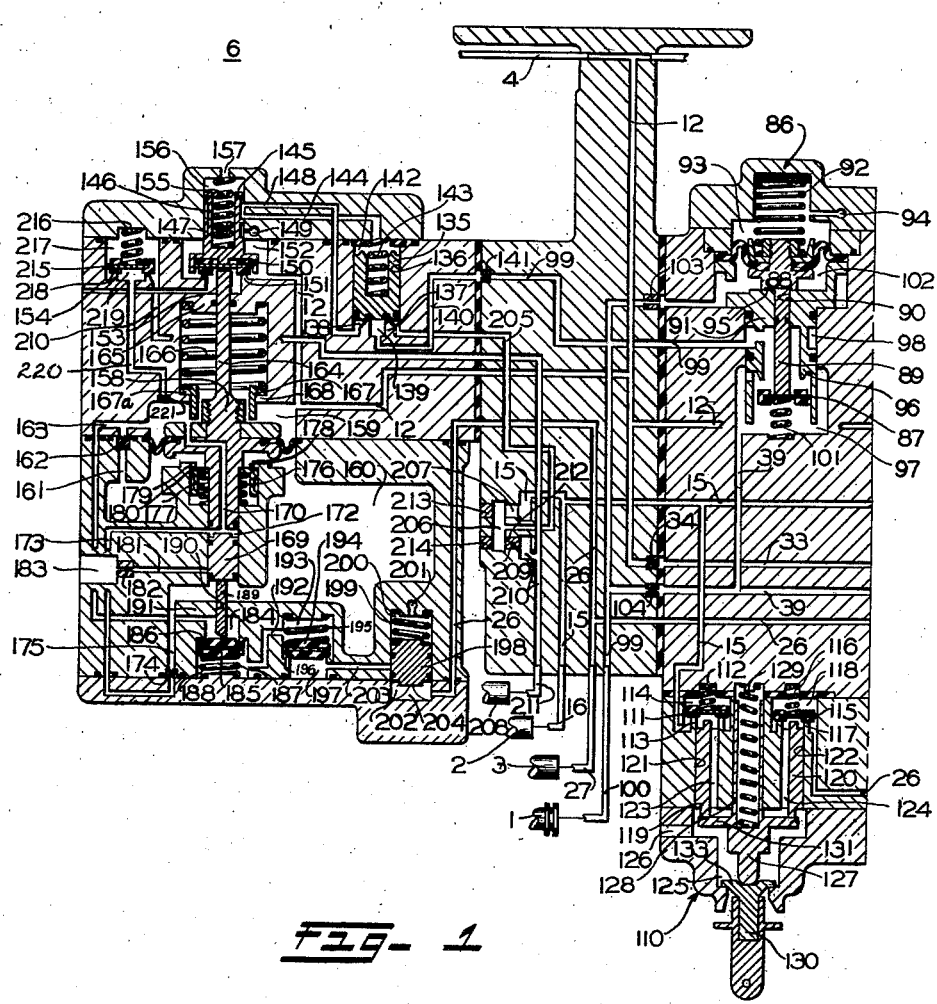

Jan. 28, 1958  E. S. COOK ET AL  2,821,442
FLUID PRESSURE BRAKE APPARATUS
Filed July 19, 1956  2 Sheets-Sheet 1

INVENTOR.
Earl S. Cook
Glenn T. McClure
BY John W. Rush

Adelbert A. Steinmiller
ATTORNEY

Jan. 28, 1958  E. S. COOK ET AL  2,821,442
FLUID PRESSURE BRAKE APPARATUS
Filed July 19, 1956  2 Sheets-Sheet 2

INVENTOR.
Earl S. Cook
Glenn T. McClure
John W. Rush
BY
Adelbert A. Steinmiller
ATTORNEY

United States Patent Office 2,821,442
Patented Jan. 28, 1958

2,821,442

FLUID PRESSURE BRAKE APPARATUS

Earle S. Cook, Pittsburgh, Glenn T. McClure, McKeesport, and John W. Rush, Pittsburgh, Pa., assignors to Westinghouse Air Brake Company, Wilmerding, Pa., a corporation of Pennsylvania Application July 19, 1956, Serial No. 598,964

8 Claims. (Cl. 303—60)

This invention relates to fluid pressure brake apparatus for railway cars, and more particularly to improvements in fluid pressure railway car brake apparatus of the type which employs a control reservoir for storing air at a reference pressure relative to which variation in pressure of fluid in a brake pipe are utilized, during both application and release of the brakes, to effect graduation in degree of pressurization of a brake cylinder according to the degree of such variation in brake pipe pressure.

Fluid pressure brake apparatus of this general type has long been popular in Europe, and has been proposed for use on cars of the new high speed passenger trains finding current use in the United States. Such brake apparatus as employed in Europe, while being reliable, relatively simple, and capable of flexible brake control in enabling release of a brake application in graduated steps, commonly known as "graduated release" of the brakes, was felt to be deficient for use in high speed passenger train service in the United States due to its lack of means for effecting, in a situation of emergency, a more rapidly effected and higher degree of brake cylinder pressurization, commonly known as an "emergency application," than the type of brake application employed during normal circumstances of train operation, commonly known as a "service application" of the brakes, and its lack of means enabling, in addition the "graduated release" of the brakes, a complete release of the brakes in response to the mere initiation in brake pipe pressure restoration without awaiting restoration in brake pipe pressure to its full normal charge value before brake release is completed, commonly referred to as a "direct release" of the brakes.

In the process of developing a fluid pressure brake apparatus to satisfy the requirements deemed to be desirable for use on cars of the new high speed passenger trains in the United States, there have evolved several forms of such apparatus which have been disclosed in the copending United States applications of John W. Rush, Serial No. 556,160, filed December 29, 1955, whereby, in addition to "graduated release" and "service application" of the brakes, "emergency application" of the brakes may be obtained, and of Richard L. Wilson et al., Serial No. 567,838, filed February 27, 1956, whereby, in addition to "service application" and "graduated release" of the brakes, "direct release" of the brakes may be obtained; both of these applications having been assigned to the assignee of the present application.

Neither of the brake apparatuses of the two above-identified copending applications alone will perform all of the desirable functions as discussed above, in view of which, it is a prime object of the present invention to provide an improved fluid pressure brake apparatus of the described type capable of selectively effecting "service application," "emergency application," "graduated release" and "direct release" of the brakes on a railway car.

It is another object of the invention to provide a fluid pressure brake apparatus embodying novel combinations of structural elements whereby the operations set forth in the preceding statement of object are obtained, singly and in combination.

According to the invention there is disclosed herein a fluid pressure brake apparatus for obtaining the above objectives which comprises in general a so-called service valve portion which is operative responsively to variations in pressure of fluid in a brake pipe relative to a reference pressure in a control reservoir to effect "service application" and "graduated release" of the brakes according to the degree of such variation in brake pipe pressure, and which also comprises an emergency control portion including, for example, means for controlling supplemental supply of fluid under pressure to the brake cylinder in effecting an "emergency application" of the brakes, as well as means for controlling admittance of fluid under pressure from the control reservoir to the brake pipe to obtain "direct release" of the brakes through resultant operation of the service valve portion.

Figure 1A:
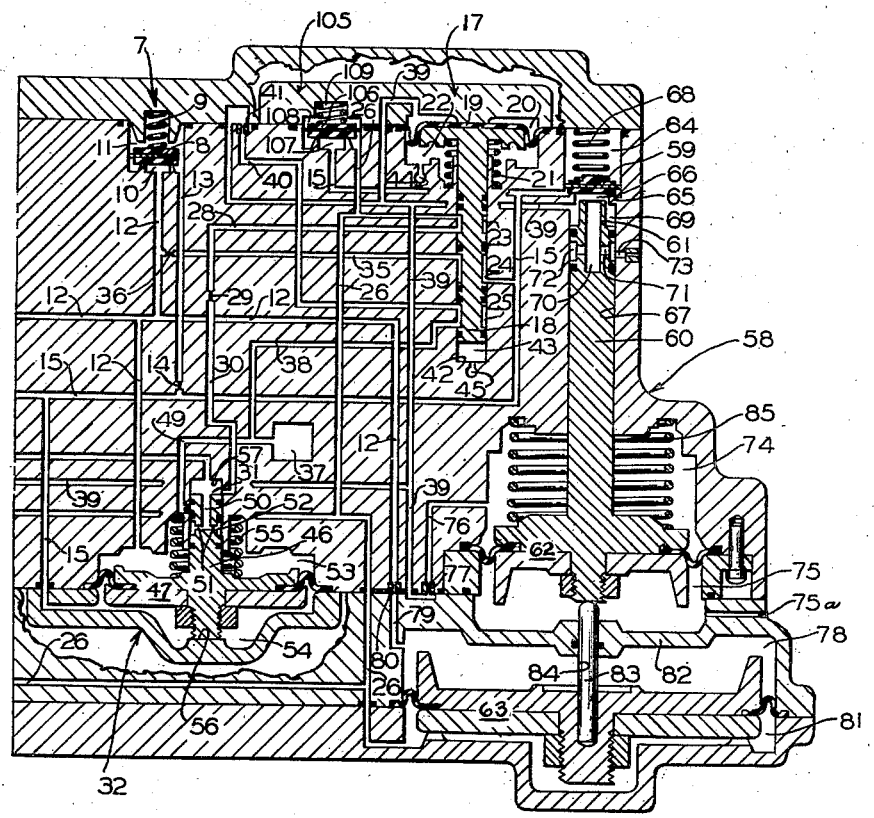

Other objects, advantages, and novel features of the invention will become apparent from the following more detailed description and the claims of such invention when taken in connection with accompanying drawings in which Figs. 1 and 1a jointly show a schematic, cross-sectional, representation of the fluid pressure brake apparatus embodying the invention.

Description

Referring to the drawing, the improved fluid pressure brake apparatus comprises the usual brake cylinder device 1 which will respond to the degree of build-up or reduction in pressure of fluid supplied thereto to effect a corresponding degree of braking of wheels on a railway vehicle through the medium of the usual brake shoes and rigging (not shown); a supply reservoir 2 for storing the fluid under pressure which is supplied to the brake cylinder device 1 during application of the brakes on the vehicle; a control reservoir 3 for storing fluid at a datum pressure for brake control purposes; the usual brake pipe 4 which extends through a train for conveying fluid under pressure to and from an engineer's brake valve device (not shown) located on the locomotive of such train; a brake controlling valve portion 5 which comprises means for effecting charging of the supply and control reservoirs 2 and 3, means for effecting local quick service withdrawal of fluid under pressure from the brake pipe 4, means for effecting supply of fluid under pressure from the supply reservoir 2 to the brake cylinder device 1 during application of the brakes and release of such fluid under pressure from said brake cylinder device following such application to release the brakes, means for controlling initial inshot of fluid under pressure supplied to the brake cylinder, and manually operable means for effecting release of fluid under pressure from the supply and control reservoirs 2 and 3 and from the brake cylinder device 1; and a portion 6 for controlling emergency application of the brakes and for selectively conditioning the brake controlling valve portion 5 for effecting either a direct or a graduated release of the brakes according to the operator's desires.

To provide for substantial charging and recharging of the supply reservoir 2, the brake controlling valve portion 5 comprises a supply reservoir charging check valve device 7 which includes a check valve 8 urged by a bias spring 9 to permit only one-way flow of fluid under pressure between a fluid pressure inlet chamber 10, in constantly open communication with the brake pipe 4 by way of branches of a brake pipe passage 12, and an outlet chamber 11, which is in constantly open communication with the supply reservoir 2 by way of a passage 13, a supply reservoir charging choke 14, branches of a supply reservoir passage 15, and a pipe 16.

During initial charging and during recharging of the supply reservoir 2, at any time that the pressure of fluid in the brake pipe 4 exceeds the pressure of fluid in the supply reservoir 2 to a degree, such as three pounds per square inch, sufficient to unseat the check valve 8 against opposition of the bias spring 9, fluid under pressure will flow from the brake pipe 4 to the supply reservoir 2 by way of the passage 12, chamber 10, the unseated check valve 8, chamber 11, passage 13, choke 14, passage 15, and the pipe 16 to charge said supply reservoir 2 to within three pounds per square inch of brake pipe pressure.

For controlling a charging communication between the brake pipe and the supply and control reservoirs 2 and 3, as well as for controlling a quick service volume blow-down communication, the brake controlling valve device 5 is provided with a cut-off valve device 17 comprising valve means in the form of stem type slide valve 18 which is operably attached to a diaphragm 19 subject opposingly to pressure of fluid in a control chamber 20 on its one face and a spring 21 disposed in a non-pressure chamber 22 at its opposite face.

The slide valve 18 comprises axially spaced apart annular grooves 23 and 24 for establishing fluid pressure communications between the brake pipe 4 and the control and supply reservoirs 3 and 2, respectively, and a groove 25 for establishing a quick service volume blow-down communication.

The groove 23 in slide valve 18 of device 17 is arranged to be in communication with the control reservoir 3 by way of a passage 26 and a pipe 27 as well as with the brake pipe 4 by way of passage 28, a control reservoir charging choke 29, a passage 30, a chamber 31 in a quick service valve device 32, a passage 33, a choke 34, and the brake pipe passage 12.

The groove 24 in slide valve 18 is arranged to be in communication with the supply reservoir 2 by way of the passage 15 and the pipe 16, and with the brake pipe passage 12 by way of a passage 35 and a supply reservoir final charge control choke 36.

The groove 25 in slide valve 18 is arranged to be in communication with a quick service volume chamber 37 by way of a quick service volume blow-down passage 38, and with a brake cylinder supply and release passage 39 by way of a passage 40 and a quick service volume blow-down choke 41; for reasons which hereinafter will become apparent.

The control chamber 20 in the cut-off valve device 17 is in constantly open communication with a branch of the brake cylinder supply and release passage 39 for reasons which hereinafter will become apparent. The value of the spring 21 in the chamber 22 of such device 17 and the area of the diaphragm 19 are such that this device is responsive to a slight increase in pressure of fluid in the chamber 20 above atmospheric pressure, to the extent of one or two pounds per square inch, for example, to move the slide valve 18 to a cut-off position, opposite to that position in which it is shown in the drawing, defined by engagement of said valve with an end wall 42 of a clearance volume 43 at one end of said stem; chamber 22 and clearance volume 43 being constantly open to the atmosphere by way of vent ports 44 and 45, respectively, to avoid entrapment of fluid under pressure which would oppose such movement. In the cut-off position of the slide valve 18, the grooves 23, 24 and 25 will be so disposed as to disestablish communication between the control reservoir passage 26 and the passage 28, between the supply reservoir passage 15 and the passage 35, and between the passage 38 and the passage 40.

For effecting quick service withdrawal of fluid under pressure locally from the brake pipe 4 on a particular car, as well as for effecting isolation of the control reservoir 3 from the brake pipe 4 upon initiation of a brake application, the quick service valve device 32 in the brake controlling valve portion 5 includes a stem type slide valve 46 operably connected to a diaphragm motor assemblage 47 to control fluid pressure communication between the brake pipe passage 33 and a quick service passage 49 by way of the chamber 31, and to control fluid pressure communication between said chamber 31 and the passage 30; the quick service passageway 49 being in constantly open communication with the quick service volume chamber 37 and the passageway 38.

The slide valve 46 includes a central passage 50 which extends in an axialwise direction from clearance chamber 31 into communication, via radial ports 51, with an annular groove 52 formed on the outer periphery of said valve for registry with the passage 49. The diaphragm motor assemblage 47 is subject on its one face to pressure of fluid in a supply reservoir pressure chamber 54 constantly open to passage 15, and on its opposite face to pressure of fluid and force of a light bias spring 55 in a brake pipe pressure chamber 53 constantly open to brake pipe passage 12. The bias spring 55 and pressure of fluid in chamber 53 act on diaphragm motor assemblage 47 and attached slide valve 46 to urge same toward the repose position in which it is shown in the drawing and in which the groove 52 is blanked off from the passage 49 and the passage 30 is open to the clearance chamber 31. Such repose position of the slide valve 46 is defined by engagement of a portion of the diaphragm motor assemblage 47 with a casing shoulder 56. An opposite quick service position of the diaphragm motor assemblage 47 and slide valve 46 in which the groove 52 is open to the passage 49 and the passage 30 is blanked off to the chamber 31, is defined by engagement of the slide valve with an end wall 57 of said chamber 31.

For controlling supply of fluid under pressure from the supply reservoir 2 to the brake cylinder device 1 and release of such fluid under pressure from said brake cylinder device, the brake controlling valve portion 5 includes a service valve device 58 which comprises a brake cylinder supply and release valve 59, an actuating stem 60 having a release valve seat element 61 formed therein for cooperation with valve 59, and movable abutment means in the form of diaphragm motor assemblages 62 and 63 operably associated with the stem 60.

The supply and release valve 59 is disposed in a supply chamber 64 which is constantly open to the supply reservoir 2 by way of the supply reservoir passage 15 and pipe 16. Valve 59 is cooperable with a valve seat 65 to control communication between the supply chamber 64 and the brake cylinder passage 39 by way of a port 66 encircled by the valve seat 65 at the end of a bore 67 which continues from such port and with the wall of which the actuating stem 60 is in slidably guided sealed cooperation. A light compression spring 68 is disposed in the chamber 64 and arranged to bias the valve 59 toward its seat 65.

The end of the actuating stem 60 in which the release valve seat element 61 is formed, is reduced in cross-section to provide an annular clearance chamber 69 between the wall of the port 66 and of the bore 67 to afford a path for flow of fluid under pressure from chamber 64 to the brake cylinder passage 39 when valve 59 is held unseated against opposition of the spring 68 by engagement of the seat element 61 therewith. A brake cylinder release passage 70, formed in the stem 60, opens through its projecting end in encirclement by seat element 61 and extends therefrom in an axial direction into intersection with a plurality of radial ports 71 opening into a groove 72 formed in the outer periphery of said stem. The groove 72 is arranged in stem 60 to be opened to a restricted exhaust passage 73 at least when seat element 61 is disposed away from the valve 59; the exhaust passage 73 being open at one end through the wall of the bore 67 and at its opposite end to the atmosphere.

The diaphragm motor assemblage 62 is operably attached to the stem 60 directly and is subject opposingly on its opposite faces to pressure of fluid in a brake cylinder pressure chamber 74 into which said stem extends and to atmospheric pressure in a non-pressure chamber 75.

The brake cylinder pressure chamber 74 is constantly open to a branch of brake cylinder passage 39 by way of a passage 76 and a stabilizing choke 77, while the non-pressure chamber 75 is constantly open to the atmosphere by way of a port 75a.

The diaphragm motor assemblage 63 is subject opposingly on its opposite faces, respectively, to pressure of fluid in a brake pipe pressure chamber 78 which is constantly open to the brake pipe passage 12 via a passage 79 and stabilizing choke 80, and to pressure of fluid in a control reservoir pressure chamber 81, which is constantly open to the control reservoir passage 26. A partition 82 separates the brake pipe pressure chamber 78 from the non-pressure chamber 75, and a stem 83, extending slidably in pressure sealed relationship through an opening 84 in said partition, is arranged to serve as the medium through which the diaphragm motor assemblage 63 cooperates with the diaphragm motor assemblage 62 to operate the stem 60.

A compression spring 85, disposed in the brake cylinder pressure chamber 74, is arranged to cooperate with said motor assemblage to act on the diaphragm motor stack in opposition to pressure of fluid in the control reservoir pressure chamber 81 and in assist to the pressures of fluid in said brake cylinder pressure chamber and in the brake pipe pressure chamber 78.

Brake controlling valve portion 5 also comprises an inshot control valve device 86 (Fig. 1) which includes a disc-shaped valve 87 operably attached to a diaphragm motor assemblage 88 through the medium of stem 89 extending slidably through a central opening 90 in a removable seat element 91 fixed to the casing. A bias spring 92, disposed in a non-pressure chamber 93 open to the atmosphere by a port 94, cooperates with the diaphragm motor assemblage 88 to urge the valve 87 to unseated position in which it is shown in the drawing defined by engagement of annular shoulder 95 with the seat element 91. In the open position of the valve 87 in which it is shown in the drawing, said valve is disposed away from an annular seat 96 formed in the seat element 91, thereby to permit communication between a chamber 97 constantly open to the brake cylinder supply and release passage 39 and an annular chamber 98 which is constantly open to the brake cylinder device 1 by way of a passage 99 and a pipe 100. A light bias spring 101 disposed in the chamber 97 is arranged to urge the valve 87 into engagement with the projecting end of the stem 89 to cause said valve to engage the annular seat 96 when said stem is retracted away from chamber 97 in the direction of the chamber 93 by operation of the diaphragm motor assemblage 88 as will be described in detail hereinafter.

The diaphragm motor assemblage 88 is subject on its face opposite to the non-pressure chamber 93 to pressure of fluid in a control chamber 102 which is constantly open to the brake cylinder passage 99 by way of a stabilizing choke 103; the brake cylinder passage 99 also being connected to the brake cylinder supply and release passage 39 by way of a choke 104.

For reasons which hereinafter will become apparent, the brake controlling valve portion 5 is provided with a check valve device 105 which permits fluid under pressure from the supply reservoir 2 to flow into the control reservoir passage 26 whenever supply reservoir pressure exceeds that in said control reservoir passage 26 to the extent of a small fraction of a pound per square inch. Check valve device 105 comprises a check valve 106 subject opposingly to pressure of fluid in an inlet chamber 107 and in outlet chamber 108. The inlet chamber 107 is constantly connected to the supply reservoir 2 by way of the passage 15 and the pipe 16, while the outlet chamber 108 is constantly open to the passage 26 which in turn is connected to the control reservoir 3 by way of the pipe 27. An extremely light bias spring 109, disposed in the outlet chamber 108, cooperates with the check valve 106 to maintain same seated during slight vibration and shock which may be experienced as a result of its use in railway car equipment.

For effecting release of fluid under pressure from the supply reservoir 2 or from the control reservoir 3 and the supply reservoir 2, the brake controlling valve portion 5 comprises a manual release valve device 110 which includes a disc-shaped valve 111 biased by spring 112 into engagement with a seat 113 for closing to the atmosphere a chamber 114 constantly open to the supply reservoir passage 15. Release valve device 110 also comprises a disc-shaped valve 115 which is urged by a bias spring 116 toward a closed position in which it is shown in the drawing in engagement with a seat 117 wherein a chamber 118 constantly open to the control reservoir passage 26 is closed off to the atmosphere. For actuating the valves 111 and 115 to their open positions, the manual release valve device 110 comprises actuating stems 119 and 120, respectively, which are slidably disposed in bores 121 and 122, respectively, formed in the casing. The actuating stems 119 and 120 are provided with passages 123 and 124, respectively, for establishing communication from the chambers 114 and 118 to the atmosphere by way of a chamber 125 and a vent port 126 when the valves 111 and 115 are unseated. As an intermediate member through which the stems 119 and 120 may be actuated, the device 110 comprises a member 127 having a hollow tubular portion 128 in slidably guided cooperation with a suitable bore formed in the casing and containing or encircling a compression spring 129 arranged to urge the member 127 into engagement with a manually rockable lever 130 extending through an opening in the casing to the exterior of the brake controlling valve portion. Lever 127 includes the usual disc 131 for cooperative engagement with the actuating stems 119 and 120. The lever 130 comprises a disc portion 133 for rocking engagement with an accommodating shoulder in the casing to cause actuation of the stems 119 and 120 as will be described hereinafter.

The emergency application control and release selector portion 6 comprises an emergency control valve 135 in the form of a piston in slidable sealed cooperation with the walls of a bore 136 for cooperation with an annular valve seat 137 at its one end to control communication between an annular chamber 138 encircling said seat and the interior thereof which defines a chamber 139 in constantly open communication with the brake cylinder passage 99 by way of a passage 140 and a choke 141. The opposite face of valve 135 is subject to pressure of fluid in a chamber 142 and to force of a light bias spring 143 disposed therein; said chamber 142 being connected to a passage 144 for supply of fluid under pressure thereto and therefrom.

For controlling supply and release of fluid under pressure to and from the chamber 142 associated with piston valve 135, portion 6 includes a cylindrical slide valve 145 comprising a pair of spaced apart annular grooves 146 and 147 formed in its outer periphery for selectively communicating the passage 144 either with a passageway 148 or with an atmospheric port 149 according to position of said valve. Attached to the slide valve 145 there is a vent valve 150 which is cooperable with a seat 151 to control communication between a brake pipe pressure chamber 152 constantly open to the passage 12 and a fluid pressure exhaust chamber 153 which is constantly open to the atmosphere by way of a passage 154. A bias spring 155, disposed in a non-pressure chamber 156 open via a port 157 to the atmosphere, cooperates with the slide valve 145 and thereby with the vent valve 150 to urge these valves toward the position in which they are shown in the drawing defined by engagement of said vent valve with the seat 151.

For actuating the slide valve 145 and the vent valve 150, the portion 6 is provided with fluid pressure motor means in the form of a diaphragm motor assemblage 158 which is subject opposingly to pressure of fluid in the brake pipe as experienced in a brake pipe pressure chamber 159 constantly open to the brake pipe passage 12 and to pressure of fluid in a quick action chamber 160 which is constantly open to the brake pipe 4 by way of passage 161, a choke 162, a brake pipe passage 163, and the chamber 159.

Operably connected to the diaphragm motor assemblage 158 there is a stem 164 which extends into proximity of vent valve 150 through an opening in a partition 165 which separates the brake pipe pressure chamber 159 from the exhaust chamber 153. A compression spring 166, disposed in encirclement of the stem 164, is arranged to urge a sleeve-like movable spring stop element 167 toward the diaphragm motor assemblage 158. A repose position of the movable stop element 167 is defined by engagement of an annular flange 167a thereon with an annular stop shoulder 168 formed in the casing.

Also operably connected to the diaphragm motor assemblage 158 is a stem type slide valve 169 which includes a passage 170 formed therein constantly open to the brake pipe pressure chamber 159 at one end and opening radially outward into communication with an annular groove 172 formed in the outer periphery of said slide valve for registration with a passage 173 constantly open to the quick action chamber 160 by way of a choke 174 and a passage 175. A compression spring 176 disposed in encirclement of the slide valve 169 cooperates with the casing to urge a sleeve-like movable stop element 177 in the direction of the diaphragm motor assemblage 158. A flange 178 on stop element 177 engages an annular rib 179 fixed to the casing to define a repose position of such stop element. An annular shoulder 180 is formed in the slide valve 169 for cooperation with the annular flange 178 of the movable stop element 177 for reasons which hereinafter will become apparent. The slide valve 169 also cooperates with a passage 181 which is constantly open to the atmosphere by way of a choke 182 and a cavity 183, to control communication between said passage 181 and the quick action chamber 160 for reasons which hereinafter will become apparent.

For controlling communication between the control reservoir 3 and the brake pipe 4 by way of a chamber 184 and the passage 163, the portion 6 is provided with a direct release control valve 185 in the form of a check valve which is urged toward an annular seat 186 by a bias spring 187 disposed in a chamber 188. Direct release control valve 185 is arranged to be operated against opposition of the spring 187 by the diaphragm motor assemblage 158 through the medium of the slide valve 169 and an abutting stem 189 which extends slidably through an opening 190 in a partition 191 separating chamber 184 from the quick action chamber 160.

The chamber 188 is constantly open by way of a passage 192 with an outlet chamber 193 at one side of a check valve 194 which is biased by spring 195 toward a seat 196 to prevent flow of fluid under pressure from the outlet chamber 193 to an inlet chamber 197. The spring 195 is a light bias spring which requires very little preponderance in pressure of fluid in the inlet chamber 197 over that in the outlet chamber 193 to effect unseating of the valve 194 to permit flow of fluid under pressure from said inlet chamber to said outlet chamber.

Also associated with the portion 6 is a protection valve device, which, for sake of illustration, may simply comprise a piston type protection valve 198 subject opposingly to force of a compression spring 199 disposed in a non-pressure chamber 200 constantly open to the atmosphere via a port 201 and to control reservoir pressure in a chamber 202 which is constantly open to the control reservoir by way of the passage 26. The protection valve 198 is slidable within a suitable bore and arranged to control communication between the chamber 202 and a passage 203 which is constantly open to the inlet chamber 197 at one side of the check valve 194.

The value of the spring 199 is such that when the control reservoir pressure as experienced in the chamber 202 is less than such as sixty pounds per square inch, for example, said piston valve will be disposed in the position in which it is shown in the drawing in contact with a fixed stop element 204, and when such control reservoir pressure in chamber 202 exceeds such value, said protection valve 198 will assume a position in the direction of chamber 200 in which the passage 203 is open to the chamber 202 for reasons which will hereinafter become apparent from description of operation.

The chamber 138 associated with the emergency control valve 135 is constantly connected to a passage 205, which is arranged to be selectively connected to the supply reservoir 2 by way of a header chamber 206, a port 207 as shown in the drawing, passage 15 and pipe 16, or to an emergency reservoir 208 by way of said header chamber 206, a port 209, a passage 210, and a pipe 211, by removal of a plug 212 from said port 209 and insertion of said plug in the port 207. Plugs 213 and 214 at the exterior of the casing may be removed to gain access to the ports 207 and 209 for such transfer of the plug 212.

To provide for charging of the emergency reservoir 208, the portion 6 is provided with an emergency reservoir charging check valve 215 which is urged by a light bias spring 216 in an outlet chamber 217 toward a seat 218 to prevent flow of fluid under pressure from said outlet chamber 217 to an inlet chamber 219; the outlet chamber 217 being constantly open to the passage 210, while said inlet chamber 219 is constantly open to the brake pipe by way of a passage 220, an emergency reservoir charging control choke 221, the chamber 159, and the passage 12.

Initial charging of the brake apparatus

Assume initially that all the passages and chambers of the brake apparatus as shown in the drawing are void of fluid under pressure; that the various parts of the apparatus are in the respective positions in which they are shown in the drawing; and, that it is desired to initially charge such apparatus. By way of the engineer's brake valve (not shown) on the locomotive, fluid under pressure will then be supplied to the brake pipe 4 and such fluid under pressure will flow therefrom into the respective passage 12 in each brake apparatus on the cars of the train. In the respective brake apparatus on any particular car of the train, fluid under pressure will flow from the passage 12 to the supply reservoir 2 by way of the inlet chamber 10 of the check valve device 7, the unseated check valve 8, and the outlet chamber 11 therein, the passage 13, the charging choke 14, passage 15, and the pipe 16. Due to the bias imposed by the spring 9 acting on check valve 8 in the supply reservoir charging check valve device 7, the supply reservoir 2 may thus be charged to within such as three pounds per square inch of brake pipe pressure, while the final charging of the supply reservoir 2 may be brought up to its full normal charge value equivalent to that of the normal charge value of the brake pipe, such as one hundred ten pounds per square inch, by way of said passage 12, the choke 36, the passage 35, the groove 24 in slide valve 18 of cut-off valve device 17, the passage 15, and the pipe 16.

At the same time, fluid under pressure will flow from passage 12 into the control reservoir 3 for charging same to its full normal charge value of such as one hundred ten pounds per square inch, initially to within three pounds per square inch of its normal charge value, by way of the passage 15, chambers 107 and 108 by unseating check valve 106, the passage 26 and pipe 27, and finally to its full charge value, by way of the choke 34, the passage 33, the chamber 31 in the quick service valve device 32, the passage 30, the control reservoir charging choke 29, the passage 28, the groove 23 in slide valve 18 of cut-off valve device 17, the passage 26, and the pipe 27.

Also at the same time, the emergency reservoir 208 will be charged with fluid under pressure from the brake pipe via passage 12, chamber 159 in emergency portion 6, the emergency reservoir charging choke 221, the passage 220, inlet chamber 219 at one side of the check valve 215, unseating check valve 215, the chamber 217, the passage 210, and the pipe 211.

During such charging of the reservoirs, fluid under pressure from the passage 12 will flow directly to the chamber 152 in emergency portion 6 and to the quick action chamber 160 to charge same to normal brake pipe pressure of such as one hundred ten pounds per square inch both by way of chamber 159, passage 163, the choke 162, and the passage 161, as well as by way of said chamber 159, the passage 170 and groove 172 in slide valve 169, the passage 173, the choke 174, and the passage 175.

During such initial charging of the quick action chamber 160, should the brake pipe pressure in chamber 159 at one side of the diaphragm motor assemblage 158 exceed the pressure of fluid in the quick action chamber 160 sufficiently to cause the direct release control valve 185 to be unseated against opposition of the spring 187 and of the spring biased stop element 177, such unseating of the valve 185 will be without effect at this time since the fluid in the brake pipe 4, at a pressure exceeding that in the control reservoir 3, will be prevented from flowing to the control reservoir by way of brake pipe passage 12, chamber 159, passage 163, chamber 184, the unseated valve 185, the passage 192 and the chamber 193, by action of the check valve 194, irrespective of the position of the protection valve 198 which upon attainment of control reservoir pressure exceeding such as sixty pounds per square inch assumes its upper position to establish communication between the passage 203 connected to outlet chamber 197 associated with check valve 194 and the passage 26 connected to control reservoir.

In the portion 5, during such charging of the reservoirs via the brake pipe passage 12, the chamber 53 in the quick service valve device 32 will be increased to normal brake pipe pressure via said passage 12 while the chamber 54 will be increased at a somewhat lesser rate to pressure of fluid in the supply reservoir 2 by way of the passage 15. In the service valve device 58 the brake pipe pressure chamber 78 will be increased to normal brake pipe pressure by way of the passage 79, the stabilizing choke 80 and the passage 12, while the chamber 81 in said service valve device will be increased at somewhat lesser rate simultaneously with that in the control reservoir 3 by way of the passage 26, while the chamber 64 in said service valve device 58 is availed with fluid at the pressure prevailing in the supply reservoir 2 by way of the passage 15.

During such initial charging of the apparatus it will be apparent that in view of the preponderance in brake pipe pressure in chamber 53 over the auxiliary reservoir pressure in chamber 54 in the quick service valve device 32, said device 32 will remain in the position in which it is shown in the drawing, and in view of the fact that the brake pipe pressure in chamber 78 in service valve device 58 preponderates over the control reservoir pressure in chamber 81 in said service valve device during such initial charging, said service valve device also will remain in the release position in which it is shown in the drawing.

By virtue of the service valve device 58 remaining in its release position during initial charging of the brake apparatus, the brake cylinder device 1 and the chamber 20 in the cut-off valve device 17 will remain vented to the atmosphere by way of the passage 39, chamber 69, port 66, passage 70, port 71, groove 72, and restricted exhaust passage 73. Thus the brake cylinder device 1 will remain devoid of fluid under pressure and the brakes on the particular car will remain released while the cut-off valve device 17 will remain in the position in which it is shown in the drawing.

*Service application of the brakes*

In effecting a service application of the brakes, initiation of such application will be effected by manipulation of the engineer's brake valve on the locomotive to reduce the pressure of fluid in the brake pipe 4. In the respective brake apparatus on the first car or perhaps first several cars of the train, such reduction in brake pipe pressure will be experienced in the brake pipe pressure chamber 53 in the quick service valve device 32 by way of the brake pipe passage 12, while any considerable reduction in supply reservoir pressure resultant from flow of fluid under pressure from the supply reservoir 2 to the brake pipe 4 by way of the pipe 16, passage 15, groove 24 in slide valve 18 of the cut-off valve device 17 and the passage 35, is prevented by the restricting effect of the choke 36 connecting said passage 35 with brake pipe passage 12. Such reduction in brake pipe pressure in the brake pipe pressure chamber 53 in the quick service valve device 32 relative to the slight reduction in supply reservoir pressure in chamber 54 therein will cause the supply reservoir pressure to preponderate over brake pipe pressure to the extent of such as seven-tenths of a pound per square inch, necessary to actuate the diaphragm motor assemblage 47 to move the slide valve 46 to its quick service position in which it contacts the end wall 57.

In such quick service position of the slide valve 46, fluid under pressure will flow locally from the brake pipe 4 on the particular car or cars in which the quick service valve device 32 has thus responded, to the quick service volume chamber 37 by way of the brake pipe passage 12, quick service control choke 34, passage 33, passage 50 in the slide valve 46 of device 32 which will be in registry with said passage 33, ports 51 and groove 52 in said slide valve, and the passage 49, while the slide valve 46 of the quick service valve device 32 closes off communication between the passage 30 and the chamber 31 in said quick service valve device to thereby isolate the control reservoir 3 from the brake pipe 4 by way of the pipe 27, passage 26, groove 23 in slide valve 18 of cut-off valve device 17, passage 28, choke 29, said passage 30, said chamber 31, the passage 33, the choke 34, and the passage 12.

Such quick service withdrawal of fluid under pressure locally from the brake pipe 4 to the quick service bulb 37 on the first car or on the first several cars of the train will cause a reduction in brake pipe pressure on the immediate succeeding car or cars sufficient to operate the respective quick service valve device thereon to rapidly propagate such quick service reduction in brake pipe pressure serially through the train from car to car.

On each car, by virtue of the size of the quick service volume chamber 37 relative to the volume of the brake pipe 4 on such car, the reduction in brake pipe pressure resultant from the filling of said quick service volume chamber will amount to such as five pounds per square inch, which reduction, as realized in the brake pipe pressure chamber 78 in the service valve device 58, will cause control reservoir pressure in chamber 78 acting on the diaphragm motor assemblage 63 to preponderate over the reduced brake pipe pressure in said chamber 78 sufficiently to effect unseating of the valve 59 by actuation of seat element 61 into engagement with said valve 59 through movement of stem 83, diaphragm motor assemblage 62, and stem 60.

By unseating of the valve 59 in the service valve device 58 as above, fluid under pressure from the supply reservoir 2 is permitted to flow to the brake cylinder device 1 by way of the pipe 16, the supply reservoir passage 15, the supply chamber 64 in said service valve device, the unseated valve 59, the port 66, the chamber 69, the brake cylinder passage 39, chamber 97 in the in-shot valve device 86, the unseated valve 87 therein, chamber 98 therein, the passage 99, and the pipe 100. At the same time, some fluid under pressure will flow from the passage 39 to the brake cylinder device 1 also by way of the application control choke 104, said passage 99, and the pipe 100.

During such initiation of a brake application, a slight amount of pressure will be dissipated from the supply reservoir 2 by flow of fluid under pressure therefrom to the brake pipe 4 by way of the pipe 16, the passage 15, the groove 24 in slide valve 18 of the cut-off valve device 17, the passage 35, the choke 36, and the brake pipe passage 12 until brake cylinder pressure as experienced in chamber 20 of said device 17 attains a value of such as two pounds per square inch, whereupon, the diaphragm 19 will be actuated against opposition of spring 21 to cause the slide valve 18 to assume its cut-off position defined by its engagement with the end wall 42 of the chamber 43.

Upon such actuation of the slide valve 18 to its cut-off position, communication between the control reservoir passage 26 and the passage 28 via the groove 23 is disestablished, communication between the auxiliary reservoir passage 15 and brake pipe passage 35 via the groove 24 is disestablished, and communication between the quick service volume blow-down passage 38 and the brake cylinder passage 40 via the groove 25 is disestablished.

Upon attainment of a brake cylinder pressure of such as ten pounds per square inch, corresponding to a value in which the brake shoes are merely advanced into engagement with the wheel, for example, such pressure as experienced in the brake cylinder pressure chamber 102 in the inshot valve device 86 via the choke 103, passage 99, and the pipe 100, will cause the diaphragm motor assemblage 88 in said inshot valve device to effect retraction of the stem 89 to permit the spring 101 to seat the check valve 87 on its seat 96 and thereby terminate communication between chambers 97 and 98. Thereafter, continued flow of fluid under pressure from the passage 39 to the brake cylinder device 1 will occur by way of the choke 104, the passage 99, and the pipe 100, in bypass of said inshot valve device.

After the pressure of fluid in the brake pipe 4 as experienced in the brake pipe pressure chamber 78 in the service valve device 58 becomes stabilized at a value determined by the engineer through the manipulation of the brake valve on the locomotive, supply of fluid under pressure from the supply reservoir 2 to the brake cylinder device 1 on a particular car will be terminated when the brake cylinder pressure as realized in the brake cylinder pressure chamber 74 in said service valve device 58 reaches a value commensurate with the reduced brake pipe pressure in chamber 78. Such brake cylinder pressure in chamber 74, in acting on the diaphragm motor assemblage 62 in assist to the spring 85 and to brake pipe pressure in chamber 78 acting on the diaphragm motor assemblage 63, will actuate the stem 60 in opposition to control reservoir pressure in chamber 81 to permit the spring 68 to move the supply and release valve 59 into engagement with its seat 65 while element 61 remains in engagement with said valve, thereby closing off the brake cylinder passage 39 from the supply chamber 64 as well as from the release passage 70 in said seat element 61, to hold the desired pressure of fluid in passage 39 and hence in the brake cylinder device 1 connected thereto.

From the foregoing it will be apparent that any particular degree of service application of the brakes may be attained by operation of the service valve device 58 according to the degree of reduction in brake pipe pressure relative to control reservoir pressure, either initially or in subsequent graduated steps, up to a full service value of brake cylinder pressure of such as fifty pounds per square inch as determined by a reduction in brake pipe pressure of, for example, twenty pounds per square inch below its normal full charge value of such as one hundred ten pounds per square inch chosen as an example.

If an over-reduction in brake pipe pressure is effected at a service rate, a reduction in brake pipe pressure greater than twenty pounds per square inch, the service valve device 58 will respond as aforedescribed to effect a further increase in brake cylinder pressure up to a maximum value of such as eighty-six or ninety pounds per square inch as determined by equalization of brake cylinder pressure with that in the supply reservoir 2.

During an application of the brakes as effected in response to a reduction in brake pipe pressure at a service rate as aforedescribed, fluid under pressure from the quick action chamber 160 in emergency portion 6 will flow to the brake pipe 4 by way of the passage 161, the choke 162, the passage 163, chamber 159, and the passage 12 as well as by way of the passage 175, the choke 174, the passage 173, groove 172 and passage 170 in slide valve 169, said chamber 159, and the passage 12. Such flow of fluid under pressure from the quick action chamber 160 to the brake pipe by way of both the choke 162 as well as the choke 174 as above, will dissipate the pressure of fluid in chamber 160 relative to the service rate of reduction in brake pipe pressure in chamber 159 at a rate sufficient to preclude establishment of a differential in pressures across the diaphragm motor assemblage 158 capable of moving stop element 167 against opposition of the spring 166. Consequently the vent valve 150 and associated valve 145 will remain in the positions in which they are shown in the drawing, and the chamber 142 associated with the emergency control valve 135 will remain connected via the passage 144 and groove 146 to the passage 148, hence to either the supply reservoir 2 or the emergency reservoir 208 according to the position of the plug 212 with respect to the ports 207 and 209, as will be appreciated from previous description. The chamber 142 thus will remain pressurized with fluid under pressure from either the emergency reservoir 208 or the supply reservoir 2, and, in assist by the spring 143, will maintain the valve 135 in its seated position in which it is shown in the drawing to prevent communication between the chambers 138 and 139.

*Graduated release of the brakes*

During an application of the brakes, graduated release of the brakes in any desired degree and in any number of desired steps may be effected by partial restoration in brake pipe pressure at a certain rate, such as that corresponding to "Running" position of the engineer's brake valve on the locomotive. When brake pipe pressure is increased at such rate, fluid under pressure from the brake pipe will flow to the quick action chamber 160 by way of brake pipe passage 12, chamber 159, passage 163, the choke 162, and passage 161, as well as by way of said chamber 159, the passage 170 and groove 172 in slide valve 169, the passage 173, the choke 174, and the passage 175, so that the differential in brake pipe pressure in chamber 159 relative to quick action chamber pressure developed will be insufficient to move the stop element 177 against opposition of the spring 176 required for unseating the direct release control valve 185 which consequently will remain closed.

At the same time, in each respective brake control apparatus, the fluid under pressure thus supplied to the brake pipe 4 at a controlled rate less than its quick release rate will flow from the brake pipe by way of the passage 12, the stabilizing choke 80, and passage 79, to the brake pipe pressure chamber 78 in the service valve device 58. When such brake pipe pressure in chamber 78, acting on the diaphragm motor assemblage 63 in assist to brake cylinder pressure in chamber 74 acting on diaphragm motor assemblage 62, is thus increased sufficiently to overcome opposition of the control reservoir pressure in chamber 81, the diaphragm motor assemblages 62 and 63, interconnected by way of the stem 83, will move the stem 60 in the direction of said control reservoir pressure chamber 81 and cause the attached valve seat element 61 to leave the valve 59 and permit release of fluid under pressure from the brake cylinder device 1 to the atmosphere by way of the pipe 100, the passage 99, the choke 104, the passage 39, the annular chamber 69 in service valve device 58, the release passage 70, port 71, and annular groove 72 in stem 60, and the restricted exhaust port 73 open to the atmosphere.

When the brake cylinder pressure as experienced in the brake cylinder pressure chamber 74 in the service valve device 58 reduces to a value commensurate with the degree of restoration in brake pipe pressure in chamber 78 in said device, pressure of fluid in the control reservoir pressure chamber 81 acting on the diaphragm motor assemblage 63, through the medium of the stem 83 and the motor assemblage 62, will actuate the stem 60 to return seat element 61 into engagement with the supply and release valve 59 to hold the desired reduced degree of brake cylinder pressure in the brake cylinder device 1.

Reduction in brake cylinder pressure as effected by operation of the service valve device 58 responsively to restoration of brake pipe pressure may be effected in any number of desired steps and to any degree up to full release of the brakes corresponding to restoration in brake pipe pressure to its full normal value of such as one hundred ten pounds per square inch, whereupon, brake cylinder pressure will be reduced to that of the atmosphere and the service valve device 58 will remain in its release position in which it is shown in the drawing.

At some time during release of the service application of the brake as above-described, the brake pipe pressure as experienced in the brake pipe pressure chamber 53 in the quick service valve device 32 will become increased sufficiently relative to supply reservoir pressure in chamber 54 to enable the spring 55 to return the slide valve 46 to the position in which it is shown in the drawing wherein the passage 30 is reopened to the chamber 31 and the passage 49 is closed to the groove 52 in said slide valve.

Closure of the passage 49 to slide valve groove 52 at this time results in bottling up pressure of fluid in the quick service volume chamber 37 since the slide valve 18 in the cut-off valve device 17 will yet remain in its cut-off position. With the quick service volume chamber thus containing fluid at a substantial pressure, initiation of an increased degree of application of the brakes at this time could not result in a quick service withdrawal of fluid under pressure from the brake pipe 4 into such already-filled quick service volume chamber.

Reestablishment of communication between the passage 30 and the chamber 31 in the quick service valve device 32 upon valve 46 thus being caused to assume the position in which it is shown in the drawing will be without effect at this time, since the control reservoir 3 remains isolated from said passage 30 by virtue of the cut-off position of the slide valve 18 in the cut-off valve device 17.

During the final stages of the graduated release of the brakes, when the reducing brake cylinder pressure attains a value of less than such as ten pounds per square inch, such brake cylinder pressure as experienced in the brake cylinder pressure chamber 102 in the inshot valve device 86 via the passage 99 and the choke 103 will permit the spring 92 to open the valve 87 through the medium of the diaphragm motor assemblage 88 and the stem 89. Thereafter, continued release of fluid under pressure from the brake cylinder device 1 will occur at a less restricted rate by way of the pipe 100, the passage 99, chambers 98 and 97 in the inshot valve device 86, the passage 39, and the service valve device 58 as previously traced.

Subsequently, during release of fluid under pressure from the brake cylinder device 1, when brake cylinder pressure as experienced in the brake cylinder pressure chamber 20 in the cut-off valve device 17 via the passage 39 reduces to a value below such as two pounds per square inch, the spring 21 will move the slide valve 18 to the position in which it is shown in the drawing thereby reestablishing registry of the passages 38 and 40 via the groove 25 of the passages 15 and 35 via the groove 24, and of the passages 28 and 26 via the groove 23.

Reestablishment of communication between the passages 38 and 40 via the groove 25 in slide valve 18 of the cut-off valve device 17 will permit the fluid under pressure trapped in the quick service volume chamber 37 to blow down to the atmosphere by way of the said passage 38, said groove 25, said passage 40, the choke 41, the brake cylinder supply and release passage 39, the service valve device 58 as previously traced, and the restricted exhaust passage 73, thereby voiding the quick service volume chamber 37 of fluid under pressure in preparation for quick service activity upon initiation of a subsequent reapplication of the brakes.

During such release of the brakes, the supply reservoir 2 will become charged from the brake pipe passage 12 to within such as three pounds per square inch of brake pipe pressure by way of the supply reservoir charging check valve device 7 as previously described, and, upon reestablishment of communication between the passages 15 and 35 via the groove 24 in the slide valve 18 of the cut-off valve device 17, final charging of the auxiliary reservoir 2 to its full normal charge value of such as one hundred ten pounds per square inch will occur by flow of fluid under pressure from brake pipe passage 12 by way of the supply reservoir charging choke 36, the passage 35, said groove 24, said passage 15, and the pipe 16.

Reestablishment of communication between the passage 28 and the passage 26 via the groove 23 in slide valve 18 of cut-off valve device 17 will enable fluid under pressure to flow from the brake pipe 4 to the control reservoir 3, to make up for any slight deficiency in pressure of fluid which may exist in the latter by way of the brake pipe passage 12, choke 34, the passage 33, the chamber 31 in the quick service valve device 32, the passage 30, control reservoir charging choke 29, said passage 28, said groove 23, said passage 26, and the pipe 27.

*Direct release of the brakes following a service application*

To effect a direct release of the brakes during a service application thereof, fluid under pressure will be supplied to the brake pipe 4 by manipulation of the engineer's brake valve on the locomotive at a certain selected quick release rate which may correspond to such as the "Full release" position of said brake valve, a rate which is greater than that employed for effecting a graduated release of the brakes, and such fluid under pressure as thus supplied rapidly to the brake pipe 4 in flowing via passage 12 to the chamber 159 in the portion 6 of the brake apparatus on the first car or several cars of the train will cause the brake pipe pressure in said chamber 159 to preponderate over the less rapidly increasing pressure of fluid in the quick action chamber 160, supplied via chokes 162 and 174 as previously described, sufficiently to cause movement of the diaphragm motor assemblage 158, the slide valve 169, spring-biased movable stop element 177 and the stem 189 to unseat the direct release control valve 185 against opposition of the light bias spring 187. Upon unseating of the direct release control valve 185, fluid under pressure from the control reservoir 3 will flow to the brake pipe 4 by way of the pipe 27, passage 26, the chamber 202 in portion 6, past valve 198 in its upper position, the passage 203, the chamber 197, the check valve 194, the passage 192, chamber 188, the unseated valve 185, the chamber 184, the passage 163, the chamber 159, and the brake pipe passage 12. Such local flow of fluid under pressure from the control reservoir 3 in the brake apparatus on a particular car to the brake pipe 4 will cause equalization in brake pipe pressure with that in the control reservoir, and a resultant increase in brake pipe pressure will be propagated to the chamber 159 in the brake apparatus on the next car of the train at a rate sufficiently rapid to operate the respective diaphragm motor assemblage 158 therein and unseat the corresponding direct release control valve 185 to permit fluid under pressure from the respective control reservoir 3 to flow in fashion as described above locally to the brake pipe 4 on such car and this in turn will cause corresponding operation on the next succeeding car, and so on serially from car to car back through the train.

Immediately upon flow of fluid under pressure from the control reservoir 3 to the brake pipe passage 12 resultant from unseating of the direct release control valve 185, brake pipe pressure suddenly becomes increased to a value in excess of that in the supply reservoir 2 so that fluid under pressure will tend to flow from said brake pipe passage 12 to said supply reservoir via the supply reservoir charging check valve device 7, passage 13, choke 14, passage 15 and the pipe 16. To discourage such flow from brake pipe passage 12 to the supply reservoir 2 on any particularly car and thereby assure that such increase in brake pipe pressure will be of rate and duration sufficient to operate the diaphragm motor assemblage 158 for unseating the direct release control valve 185 on the succeeding car of the train, the spring-loaded check valve 8 in device 7, in requiring such as the three pounds per square inch differential for unseating, limits the degree to which the increased brake pipe pressure in passage 12 may be dissipated into the supply reservoir 2, while the choke 14 interposed between passages 13 and 15 restricts the rate at which such dissipation may occur.

In the fluid pressure brake apparatus on each particular car, as the fluid under pressure flows from the control reservoir 3 to the brake pipe 4 by way of the unseated direct release control valve 185 in portion 6, the resultant equalization in these two pressures as experienced in the control reservoir and brake pipe pressure chambers 81 and 78 in the respective service valve device 58 of such apparatus will permit the brake cylinder pressure and the spring 85 in the brake cylinder pressure chamber 74 acting on the diaphragm motor assemblage 62 to actuate the stem 60 to its release position in which the attached seat element 61 leaves the supply and release valve 59 and thereby permits fluid under pressure from the brake cylinder device 1 to release to the atmosphere by way of the pipe 100, the passage 99, the choke 104, the brake cylinder supply and release passage 39, annular chamber 69, the port 66, passage 70 in said seat element 61, port 71 and annular groove 72 in the stem 60, and the restricted exhaust passage 73, until the fluid in the brake cylinder device 1 is thereby completely released and brake cylinder pressure reduced to that of the atmosphere.

Initially during operation of the diaphragm motor assemblage 158 to effect unseating of the direct release control valve 185 to permit flow of fluid under pressure from control reservoir 3 to the brake pipe 4 as above described, in addition to such unseating of the direct release control valve 185, movement of the slide valve 169 through the medium of which said check valve 185 is unseated, will cause the annular groove 172 to be advanced beyond the port end of the passage 173 and thereby disestablish communication between the quick action chamber 160 and the brake pipe 4 by way of passage 175, the choke 174, said pasasge 173, passage 170 in said valve 169, the chamber 159 and the brake pipe passage 12, while the quick action chamber 160 remains open to the brake pipe 4 via passage 161, the single choke 162, passage 163, chamber 159, and the passage 12. Such closure of the quick action chamber 160 to the brake pipe 4 via the choke 174 in permitting flow of fluid under pressure from said brake pipe to said quick action chamber exclusively by way of the choke 162 at this time, assists in maintaining the necessary pressure differential across the diaphragm motor assemblage 158 to hold the direct release control valve 185 open for a sufficient length of time to assure the desired flow of fluid under pressure from the control reservoir 3 to the brake pipe 4 for equalization of their pressures. Following such equalization, during subsequent increase in brake pipe pressure as continued by flow of fluid under pressure thereto from the engineer's brake valve on the locomotive, the quick action chamber pressure at one side of diaphragm motor assemblage 158 will become equalized with respect to brake pipe pressure on the opposite side of said assemblage sufficiently to permit the spring 176 to return the slide valve 169 to the position in which it is shown in the drawing and allow the valve 185 to be closed by the spring 187.

Subsequently as brake pipe pressure is increased to its normal full charge value such as one hundred ten pounds per square inch by a flow of fluid under pressure from the brake valve device on the locomotive to the brake pipe from the brake valve device on the locomotive, such fluid under pressure will flow to the supply reservoir 2 to charge same to within such as three pounds per square inch of its normal charge value by way of the brake pipe passage 12, the supply reservoir charging check valve device 7, the passage 13, the choke 14, the passage 15, and the pipe 16. At the same time, the control reservoir 3, deficient in pressure of fluid as a result of the previously described equalizing flow of fluid under pressure to the brake pipe by way of the unseated direct release control valve 185, will also be recharged to within three pounds per square inch of its normal full charge value by flow of fluid under pressure from passage 15 supplying the supply reservoir 2, the inlet chamber 107 of the check valve device 105, and, by unseating the check valve 106 against the light bias spring 109, the outlet chamber 108 of said device 105, the passage 26, and the pipe 27.

Upon reduction in brake cylinder pressure to a value less than such as ten pounds per square inch during direct release of the brakes, the inshot valve device 86 will respond as previously described in connection with graduated release of the brakes to assume the position in which the check valve 87 becomes seated, whereupon, continued release of fluid under pressure from the brake cylinder device 1 will transpire exclusively by way of the passageway 39, the choke 104, passage 99, and the pipe 100 until said brake cylinder device is devoid of fluid under pressure. During such release, when brake cylinder pressure reduces to the extent of such as two pounds per square inch, such brake cylinder pressure as experienced in the control chamber 20 in the cut-off valve device 17 will permit the spring 21 to return the slide valve 18 to the position in which it is shown in the drawing to permit charging of auxiliary and control reservoirs 2 and 3 to their full normal charge value and permit the quick service volume chamber 37 to blow down to the atmosphere as previously described in connection with description of graduated release of the brakes.

To assure that the pressure of fluid in the control reservoir 3 will not be depleted to an extent such that an effective reapplication of the brakes cannot be effected, such as might result if a number of successive brake applications and quick release operations were effected in succession too rapid to permit adequate recharging of the control reservoir 3, when control reservoir pressure in chamber 202 drops below such as sixty pounds per square inch, the spring 199 will effect closure of the protection valve 198 to close off the inlet chamber 188 from the control reservoir passage 26 to prevent any subsequent flow of fluid under pressure from said control reservoir to the brake pipe by way of the direct release control valve 185 when unseated thereafter, until control reservoir pressure is restored above such sixty pounds per square inch value. Such closure of the protection valve 198 at a control reservoir pressure of such as sixty pounds per square inch as chosen example, will enable a subsequent reduction in brake pipe pressure to effect, through the operation of the service valve device 58 as previously described, an equalization between pressure in the supply reservoir 2 and that in the brake cylinder device 1 by flow of fluid from said supply reservoir at a corresponding pressure, and thereby attain a resultant brake cylinder pressure which will be effective to adequately brake the wheels of the railway car.

*Emergency application of the brakes*

Assume that, in each fluid pressure brake apparatus throughout the train, the plug 212 is disposed in the port 209, the port 207 is open, and therefore the supply reservoir 2 is connected to the passage 205 by way of the pipe 16, the passage 15, header chamber 206, and said port 207. Assume further that the brakes on the cars throughout the train are released and that it is desired to effect an emergency application of such brakes.

In the well-known manner, the pressure of fluid in the brake pipe 4 will be reduced at an emergency rate by manipulation of the usual engineer's brake valve device on the locomotive. In the manner as previously described in connection with a service application of the brakes, the initial reduction in brake pipe pressure will effect operation of the respective quick service valve devices 32 in the brake apparatuses on the cars throughout the train which in turn will cause operation of the respective service valve devices 58 to effect inshot supply of fluid under pressure to the respective brake cylinder devices 1, closure of the respective charging valve devices 17 and, subsequently when brake cylinder pressure increases to a value above such as ten pounds per square inch, closure of the respective inshot valve devices 86. The rate of propagation of quick service activity through the train will occur approximately at a rate of nine hundred feet per second.

As a result of the emergency rate of reduction in brake pipe pressure as effected on the locomotive as well as the quick service rate of reduction as effected by operation of the quick service valve device 32 on any particular car of the train, the reduction in brake pipe pressure as experienced in the brake pipe pressure chamber 159 of portion 6 in any particular brake apparatus will create a sufficient reduction in brake pipe pressure in said chamber 159 relative to the quick action chamber pressure in chamber 160 to cause the diaphragm motor assemblage 158 to move in the direction of said chamber 159 against opposition of the spring 166 and, through the medium of the stem 164, unseat the vent valve 150 and move the slide valve 145 to an uppermost position in which the groove 147 therein establishes communication between the passage 144 and the vent port 149 while disestablishing registry of the passage 148 with said passage 144.

Upon unseating the vent valve 150, fluid under pressure from the brake pipe 4 will flow locally to the atmosphere by way of the brake pipe passage 12, the chamber 152, the unseated vent valve 150, the chamber 153, and the passage 154. Resultant local reduction in brake pipe pressure at a relatively rapid rate will be experienced in the brake pipe pressure chamber 159 on the next car or next several cars of the train which will cause a corresponding operation of the respective diaphragm motor assemblage or assemblages 158 in the apparatus thereon, which in turn will effect unseating of the respective vent valves 150 for effecting corresponding local venting of fluid under pressure from the brake pipe 4. This action will be repeated serially from car to car back through the train at a propagation rate of such as six hundred feet per second.

At the same time, in the respective fluid pressure brake apparatus on any particular car of the train, the venting of the chamber 142 above the emergency control piston valve 135 resultant from movement of the slide valve 145 to its uppermost position as previously described, will permit the brake cylinder pressure, as experienced in the chamber 139 via passage 140, choke 141 and passage 99, as well as the supply reservoir pressure in chamber 138 to actuate said piston valve 135 against opposition of the spring 143 to its uppermost position and establish communication between the two chambers 138 and 139. On thus opening chamber 139 to the chamber 138, fluid under pressure from the supply reservoir 2, in addition to flowing to the brake cylinder device 1 by way of the service valve device 58 and the choke 104 as previously described, will also flow to said brake cylinder device 1 by way of the pipe 16, the passage 15, port 207, header chamber 206, the passage 205, said chamber 138, said chamber 139, passage 140, the choke 141, passage 99, and the pipe 100. By virtue of such flow of fluid under pressure to the brake cylinder device 1 by way of the unseated emergency application control valve 135 and the choke 141 in addition to the service valve device 58 and the choke 104, brake cylinder pressure will be built up at a more rapid rate than otherwise prevails during the establishing of a service application of the brakes, and where, as in the instant case in consideration, the emergency reservoir 208 is not employed, the brake cylinder pressure will continue to be increased by supply of fluid under pressure thereto from the supply reservoir 2 until the pressure in the brake cylinder device 1 equalizes with that in the supply reservoir 2 at such as ninety pounds per square inch.

In addition to unseating of the vent valve 150 and movement of the slide valve 145 to an uppermost position upon response to reduction in brake pipe pressure at an emergency rate, the diaphragm motor assemblage 158 also moves the slide valve 169 upwardly as viewed in the drawing and simultaneously blanks off the passage 173 to the annular groove 172 and opens the passage 181 to the quick action chamber 160 to permit fluid under pressure therein to exhaust to the atmosphere at a controlled rate by way of said passage 181, the choke 182, and the cavity 183. Such evacuation of fluid under pressure from the quick action chamber 160 to the atmosphere rather than to the brake pipe passage 12 via passage 170 at such time, acts to further assure that brake pipe pressure will continue to reduce rather than in acting as a deterrent to such reduction. During continued reduction in brake pipe pressure to that of the atmosphere, the pressure of fluid in the quick action chamber 160 in escaping to the brake pipe via passage 161 and choke 162 and to the atmosphere by way of the passage 181 and choke 182 will reduce sufficiently to enable the spring 166 acting through the medium of the movable stop element 167 to effect return of the diaphragm motor assemblage 158, attached stem 164 and slide valve 169 to the positions in which they are shown in the drawing defined by engagement of the annular shoulder 180 with the spring-biased movable stop element 177 as positioned in contact with the annular shoulder 179. At the same time, spring 155 returns the slide valve 145 to the position in which it is shown in the drawing defined by seating engagement of the vent valve 150 with its seat 151, in preparation for subsequent quick release activity when called for or the effecting of a subsequent emergency application of the brakes following their release.

When it is desired that the emergency reservoir 208 be employed in connection with effecting emergency application of the brakes, the plug 212 will be removed from the port 209 and transferred to the port 207 to connect the chamber 138 associated with the emergency application control valve 135 to the emergency reservoir 208 by way of the passage 205, header chamber 206, the port 209, passage 210 and the pipe 211, so that upon unseating of the emergency application control valve 135 as described in a preceding paragraph, fluid under pressure from the emergency reservoir 208 will flow to the brake cylinder device 1 in addition to fluid under pressure supplied thereto from the supply reservoir 2 by way of the service valve device 58. In this case, the size of the supply reservoir will be reduced for equalization in pressure with that in the brake cylinder device 1 at such as fifty or sixty pounds per square inch from a normal pressure of one hundred ten pounds per square inch, and the pressurization of the brake cylinder device as a result of the additional supply of fluid under pressure thereto from the emergency reservoir 208 will result in the brake cylinder pressure of eighty-six or ninety pounds per square inch, as chosen for example.

Although it is preferred that emergency supply of fluid under pressure to the brake cylinder device in supplement to service supply of fluid under pressure thereto be under control of such as the piston valve 135 under pilot control of the cylindrical slide valve 145, this is a matter of fluid handling capacity, but conceivably, the structure could be simplified by elimination of valve 135 and modification of the slide valve 145 to perform the functions of said valve 135, i. e., by proportioning groove 147 for increased flow capacity, connecting port 149 to brake cylinder passage 140 instead of to the atmosphere, connecting passage 205 to passage 144, and eliminating the groove 146 and passage 148.

*Release of the brakes following an emergency application*

During the existence of an emergency application of the brakes, graduated release of the brakes may be effected in substantially the same manner as that previously described in connection with the graduated release of the brakes effected during a service application thereof. In response to restoration of pressure of fluid in the brake pipe 4 at a rate less than its quick release rate and corresponding to such as "Running" position of the engineer's brake valve device on the locomotive, such rate of restoration in brake pipe pressure as experienced in the brake pipe pressure chamber 78 in the service valve device 58 in the fluid pressure brake apparatus on any particular car of the train, eventually will become increased sufficiently to enable such brake pipe pressure in chamber 78, in acting on the diaphragm motor assemblage 63 in assist by spring 85 and brake cylinder pressure in chamber 74 acting on the diaphragm motor assemblage 62, to overcome control reservoir pressure in chamber 81 acting on said diaphragm motor assemblage 63 and move the stem 60 to the position in which it is shown in the drawing. In such positioning of the stem 60, the seat element 61 is carried out of engagement with the valve 59 to permit fluid under pressure from the brake cylinder device 1 to release to the atmosphere by way of the pipe 100, the passage 90, the choke 104, the passage 39, the annular chamber 69 in said service valve device 58, the passage 70, port 71, and groove 72 in said stem 60, and the restricted exhaust passage 73. Under such circumstances if the brake pipe pressure is only partially restored to its full normal charge value of such as one hundred ten pounds per square inch, the respective service valve device 58 on any particular car will respond to assume its lap position for holding the brake cylinder pressure commensurate with the reduced brake pipe pressure being held, as will be understood from previous description in connection with graduated release of a service application of the brakes.

During existence of an emergency application of the brakes, the effecting of a graduated release of the brakes requires the brake pipe pressure to be built up from atmospheric pressure to a value of such as twenty-eight pounds per square inch, with the brake cylinder pressure at the exemplified value of eighty-six pounds per square inch and control reservoir pressure is at one hundred ten pounds per square inch, before the service valve device 58 will be caused to assume its release position to initiate the release of fluid under pressure from the brake cylinder device 1, and thereafter release of fluid under pressure from said brake cylinder device will continue according to restoration in brake pipe pressure resulting from charging of the brake pipe from the brake valve on the locomotive. Where a more rapid release of the brakes during an emergency application is desirable, a direct release may be effected, in which case, pressure of fluid will be restored in the brake pipe at a fast release rate corresponding to such as "Full release" position of the engineer's brake valve on the locomotive, and such increase in brake pipe pressure as experienced in the brake pipe pressure chamber 159 in the fluid pressure brake apparatus on the first car or first several cars of the train will cause the respective diaphragm motor assemblage 158 or assemblages 158, depending upon the number of cars affected initially, to actuate the slide valve 169 and stem 189 to unseat the direct release control valve 185 to cause fluid under pressure to flow from the control reservoir 3 into the brake pipe 4 by way of said unseated valve 185, etc. as previously described in connection with direct release during existence of a service application of the brakes. The resultant equalization between control reservoir and brake pipe pressures will result in a pressure of such as eighty-six pounds per square inch and will immediately cause the respective service valve device or devices 58 to assume and remain in release position to permit complete and full release of fluid under pressure from the respective brake cylinder device or devices 1, and, at the same time, cause the diaphragm motor assemblage 158 in the fluid pressure brake apparatus on the next car of the train to effect unseating of the direct release control valve 185 therein to correspondingly effect equalization of the control reservoir 3 with the brake pipe 4, with resultant local increase in brake pipe pressure on such car at a rapid rate, which in turn will cause unseating of the valve 185 on the next car, and so on serially from car to car back through the train. With such quick release of the brakes as initiated during an emergency application thereof, it will be appreciated that such emergency application may be released throughout the length of the train at a relatively rapid rate as compared to release initiated during the existence of a service application.

The recharge of the reservoirs during and following release of the brakes as initiated during an emergency application, will occur in substantially the same manner as previously described in connection with a brake release following a service application.

*Manual release of the brakes*

To effect a manual release of the brakes locally at any particular car, the operator will exert a pulling force on the lever 130 to cause the disc portion 133 of lever 130 to rock on the accommodating casing shoulder, and, through the medium of lever 127, cause upward movement of the stems 119 and 120. Stem 120 being longer than that of stem 119, such rocking movement of the lever 130 may be limited to the extent necessary to cause upward movement of the stems 119 and 120 sufficiently to unseat the check valve 115 only, while the check valve 111 remains seated. Upon unseating of the check valve 115, fluid under pressure from the control reservoir 3 will flow to the atmosphere by way of the pipe 27, the passage 26, chamber 118, the unseated check valve 115, passage 124 in stem 120, the chamber 125, and the vent port 126. The resultant reduction in control reservoir pressure as experienced in the control reservoir pressure chamber 81 in the respective service valve device 58 will cause the spring 85 and brake cylinder pressure in chamber 74 acting on the diaphragm motor assemblage 62 in assist by brake pipe pressure in chamber 78 acting on the diaphragm motor assemblage 63 to move the stem 60 downwardly, as viewed in the drawing, and carry the attached seat element 61 away from the valve 59 to permit release of fluid under pressure from the brake cylinder device 1 by way of the passage 70 in said stem 60. The degree of reduction in brake cylinder pressure resultant from such operation of the lever 130 will depend upon the length of time that the check valve 115 is held unseated. The degree in reduction in control reservoir pressure required to cause the service valve device 58 to assume its release position will depend to a great extent upon the degree of brake cylinder pressure existent in the chamber 74, as well as upon the degree of brake pipe pressure existing in the chamber 78.

During such release of fluid under pressure from the control reservoir 3 via the manual release valve device 110 as above described, if the control reservoir pressure is reduced to a value less than the pressure of fluid existent in the supply reservoir 2, fluid under pressure will flow from the supply reservoir 2 to the atmosphere together with that from the control reservoir 3, by way of the pipe 16, the passage 15, the chamber 107, the lightly biased check valve 106, the chamber 108, the passage 26, and the unseated check valve 115 in said manual release valve device. Such flow of fluid under pressure from the supply reservoir 2 at this time will effect reduction in supply reservoir pressure in the chamber 54 in the quick service valve device 32 sufficient to first cause brake pipe pressure in chamber 53 to return assemblage 47 and attached valve 46 to their positions in which they are shown in the drawing and thereafter to prevent an unintended initiation of quick service activity such as could otherwise result during a manual release of a service application of the brakes when brake cylinder pressure in chamber 20 in the cut-off valve device 17 is reduced sufficiently to enable said cut-off valve device to return to the position in which it is shown in the drawing wherein fluid under pressure will then flow from the brake pipe 4 to the control reservoir 3 by way of the passage 12, the choke 34, the passage 33, chamber 31 in said quick service valve device 32, the passage 30, the choke 29, the passage 28, the groove 23 in slide valve 18 of said cut-off valve device 17, and the passage 26, and to the atmosphere by way of the unseated check valve 115 in the manual release valve device 110 as previously traced. The reduction in brake pipe pressure resultant from such flow from the brake pipe 4 to the control reservoir 3 and to the atmosphere as experienced in the brake pipe pressure chamber 53 in the quick service valve device 32, without the reduction in supply reservoir pressure in the chamber 54 by flow via the check valve 106, could then cause the quick service valve device 32 to unintentionally assume its quick service position in which a local reduction in brake pipe pressure is initiated, with consequent operation of the service valve device 58 to its service position and undesired resupply of fluid under pressure to the brake cylinder device 1 which would defeat the purpose of effecting a manual release of brakes.

If it is desired to effect more rapid release of fluid under pressure from the supply reservoir 2 in addition to releasing fluid under pressure from the control reservoir 3 for consequent release of fluid under pressure fom the brake cylinder device 1 as above-described, the lever 130 may be rocked about its disc portion 133 to an extent necessary to unseat the check valve 111 through the medium of the stem 119 while the check valve 115 is unseated by the stem 120. Fluid under pressure from the supply reservoir 2, in addition to flowing to the atmosphere by way of the check valve device 105, the passage 26 and check valve 115 as aforedescribed, will also flow to the atmosphere by way of the pipe 16, the pipe 15, the chamber 114, the unseated check valve 111, the passage 123 in stem 119, the chamber 125, and the port 126.

Upon return of the lever 130 to the position in which it is shown in the drawing, the spring 129 in cooperation with the casing will return the member 127 to the position in which it is shown in the drawing and in which position the stems 119 and 120 are retracted away from the check valves 111 and 115 which will become seated by action of the springs 112 and 116, respectively, to terminate release of fluid under pressure from the control and supply reservoirs 3 and 2, respectively.

Having now described the invention, what we claim as new and desire to secure by Letters Patent, is:

1. In a fluid pressure brake apparatus for railway cars, in combination, a normally charged brake pipe; a normally charged control reservoir; a brake cylinder device; a supply reservoir normally charged with fluid under pressure for supply to said brake cylinder device; service valve means responsive to reduction in brake pipe pressure relative to control reservoir pressure to effect supply of fluid under pressure from said supply reservoir to said brake cylinder device, responsive to degrees of restoration in brake pipe pressure relative to control reservoir pressure during a brake application to effect corresponding degrees of reduction in brake cylinder pressure by partial release of fluid under pressure from said brake cylinder device, and responsive to equalization of control reservoir pressure with brake pipe pressure during a brake application to effect continuous reduction in brake cylinder pressure to that of the atmosphere by complete release of fluid under pressure from said brake cylinder device; a normally closed vent valve controlling a vent communication from said brake pipe to the atmosphere; a normally closed direct release control valve controlling a communication from said control reservoir to said brake pipe; and a diaphragm motor assemblage operatively connected both to said vent valve and to said direct release control valve, said motor assemblage being responsive to reduction in brake pipe pressure at a rate exceeding a service rate to open said vent valve for venting fluid under pressure from said brake pipe to effect a local reduction in brake pipe pressure also at a rate exceeding a service rate of reduction, and responsive to restoration in brake pipe pressure at a rate exceeding a certain rate to open said direct release control valve to permit fluid under pressure from said control reservoir to flow to said brake pipe for equalization in pressure therebetween and increase in brake pipe pressure also at a rate exceeding said certain rate.

2. The combination as set forth in claim 1, further including protection valve means controlled by pressure of fluid in said control reservoir and operable to prevent release of fluid under pressure from said control reservoir into said brake pipe when control reservoir pressure is below a value which might jeopardize realization of an adequate brake application if such application were initiated at that time.

3. The combination as set forth in claim 1, further including emergency supply control valve means controlled by operation of said diaphragm motor assemblage to establish, responsively to reduction in brake pipe pressure at a rate exceeding a service rate, a supplemental fluid pressure supply communication from a source of fluid under pressure to said brake cylinder device in addition to the fluid pressure supply communication to said brake cylinder device established by said service valve means responsively to such reduction.

4. The combination as set forth in claim 3, further including a normally charged emergency reservoir, and means selectively positionable manually to connect either said supply reservoir or said emergency reservoir to said emergency supply control valve means to constitute said source of fluid under pressure for supply to said brake cylinder device via said supplemental fluid pressure supply communication.

5. The combination as set forth in claim 3, further characterized in that said normally charged supply reservoir is of such size as will pressurize said brake cylinder device in excess of that normally realized as a result of a full service reduction in brake pipe pressure and constitutes the source of fluid under pressure from which said supplemental fluid pressure supply communication is established by said emergency supply control valve means.

6. The combination as set forth in claim 1, including quick service valve means responsive to a slight degree of preponderance in supply reservoir pressure over brake pipe pressure to assume a quick service position establishing a quick service communication for local withdrawal of fluid under pressure from said brake pipe with a resultant reduction in brake pipe pressure to which said service valve means will respond to effect supply of fluid under pressure from said supply reservoir to said brake cylinder device, and responsive to preponderance in brake pipe pressure over supply reservoir pressure to assume a normal position in which said quick service communication is disestablished; means defining a fluid pressure passage open to said brake pipe when said quick service valve means is in said normal position; a cut-off valve device responsive to pressure of fluid obtaining in said brake cylinder device below and above a certain brake cylinder pressure to establish and disestablish, respectively, fluid pressure communication between said control reservoir and said fluid pressure passage; manual release valve means operable during a brake application to connect said control reservoir to the atmosphere for reduction in control reservoir pressure to cause said service valve means to release fluid under pressure from said brake cylinder device; and one-way flow means permitting flow of fluid under pressure from said supply reservoir to said control reservoir whenever pressure of fluid in the former slightly exceeds that in the latter, thereby to obtain a reduction in supply reservoir pressure which will be sufficient to cause said quick service valve means to assume said normal position and to remain in such position even though pressure of fluid in said brake pipe be reduced by flow of fluid under pressure therefrom to the vented control reservoir via said fluid pressure passage and said cut-off valve device upon reduction in brake cylinder pressure below said certain brake cylinder pressure.

7. The combination as set forth in claim 6, wherein said quick service valve means also controls fluid pressure communication between said fluid pressure passage and said brake pipe, closing off said fluid pressure passage to said brake pipe upon assuming said quick service position and opening said fluid pressure passage to said brake pipe upon assuming said normal position.

8. Fluid pressure brake apparatus as set forth in claim 1, further characterized in that said diaphragm motor assemblage is subject opposingly to pressure of fluid in a brake pipe pressure chamber constantly open to said brake pipe substantially without restriction and to pressure of fluid in a quick action chamber, and in that said apparatus further includes means defining a first restricted passage constantly connecting said quick action chamber with said brake pipe pressure chamber; means defining a second restricted passage for communication between said brake pipe pressure chamber and said quick action chamber; means defining a restricted exhaust passage open to the atmosphere; a slide valve attached to said diaphragm motor assemblage operable to open said second restricted passage while said vent valve and said direct release valve are closed and to close said second restricted passage when either said vent valve or said direct release valve is open, and operable to open said fluid pressure exhaust passage to said quick action chamber when said vent valve is open and to close said fluid pressure exhaust passage to said quick action chamber at all other times; and first and second caged spring means cooperable with said diaphragm motor assemblage to oppose movement of same in opposite directions for opening of said vent valve and said direct release control valve, respectively.

References Cited in the file of this patent

UNITED STATES PATENTS

| 1,986,472 | Good | Jan. 1, 1935 |
| 2,276,927 | Christen | Mar. 17, 1942 |

FOREIGN PATENTS

| 605,781 | Great Britain | July 30, 1948 |